United States Patent
Syresin et al.

(10) Patent No.: US 11,181,656 B2
(45) Date of Patent: Nov. 23, 2021

(54) SYSTEMS AND METHODS FOR ACQUIRING ORTHOGONAL PAIRS OF WAVEFORMS FOR ACOUSTIC WELL LOGGING

(71) Applicant: Schlumberger Technology Corporation, Sugar Land, TX (US)

(72) Inventors: Denis Syresin, Kanagawa-ken (JP); Hiroshi Akima, Kanagawa-ken (JP); Takashi Katagiri, Kanagawa-ken (JP); Atsushi Oshima, Tokyo (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 681 days.

(21) Appl. No.: 15/838,746

(22) Filed: Dec. 12, 2017

(65) Prior Publication Data
US 2019/0179048 A1 Jun. 13, 2019

(51) Int. Cl.
*G01V 1/46* (2006.01)
*G01V 1/50* (2006.01)

(52) U.S. Cl.
CPC .......... *G01V 1/46* (2013.01); *G01V 1/50* (2013.01); *G01V 2200/16* (2013.01); *G01V 2210/322* (2013.01); *G01V 2210/42* (2013.01)

(58) Field of Classification Search
CPC ........ G01V 1/46; G01V 1/50; G01V 2200/16; G01V 2210/322; G01V 2210/42
See application file for complete search history.

(56) References Cited

U.S. PATENT DOCUMENTS

| | | | |
|---|---|---|---|
| 4,564,018 A * | 1/1986 | Hutchison | A61B 8/10 600/452 |
| 4,939,698 A * | 7/1990 | Murphree | G01S 15/107 367/101 |
| 4,951,267 A | 8/1990 | Chang et al. | |
| 8,902,702 B2 * | 12/2014 | Hirabayashi | G01V 1/42 367/31 |
| 9,239,997 B2 * | 1/2016 | Bobo | G06Q 10/08 |
| 2008/0162098 A1 * | 7/2008 | Suarez-Rivera | G01V 11/00 703/10 |

(Continued)

FOREIGN PATENT DOCUMENTS

| WO | WO-2016141110 A1 * | 9/2016 | ........... E21B 47/002 |
|---|---|---|---|
| WO | WO2016141110 A1 | 9/2016 | |

OTHER PUBLICATIONS

Preliminary Search Report and Written Opinion dated Mar. 31, 2020 issued in the equivalent FR application No. 18/72803 with cover letter and agent's summary (12 pages).

*Primary Examiner* — Douglas Kay

(57) ABSTRACT

A system may obtain orthogonal pairs of acoustic waveforms obtained by a rotating downhole acoustic tool. The downhole tool may include an acoustic transmitter and an acoustic receiver. A computing device communicatively coupled to the downhole tool that instructs the transmitter to generate the various waveforms detected by the acoustic receiver and store the various waveforms in a buffer. Each waveform of a subset of the various waveforms oriented in a similar direction may be stacked to generate a composite waveform with reduced noise. The computing system may determine an orthogonal pair of waveforms based on the composite waveform and remaining waveforms.

18 Claims, 7 Drawing Sheets

(56) References Cited

U.S. PATENT DOCUMENTS

| | | | | |
|---|---|---|---|---|
| 2011/0043197 A1* | 2/2011 | Trontelj | ............... | G01D 5/145 |
| | | | | 324/207.25 |
| 2011/0255370 A1* | 10/2011 | Hirabayashi | ............ | G01V 1/42 |
| | | | | 367/31 |
| 2012/0044783 A1* | 2/2012 | Wang | ..................... | G01V 1/46 |
| | | | | 367/35 |
| 2014/0195160 A1* | 7/2014 | Collins | ................. | G01V 1/36 |
| | | | | 702/9 |
| 2014/0241111 A1 | 8/2014 | Mickael | | |
| 2015/0112596 A1* | 4/2015 | Collins | ................. | G01V 1/52 |
| | | | | 702/6 |
| 2016/0146967 A1* | 5/2016 | Frey | ...................... | G01V 3/26 |
| | | | | 324/338 |

* cited by examiner

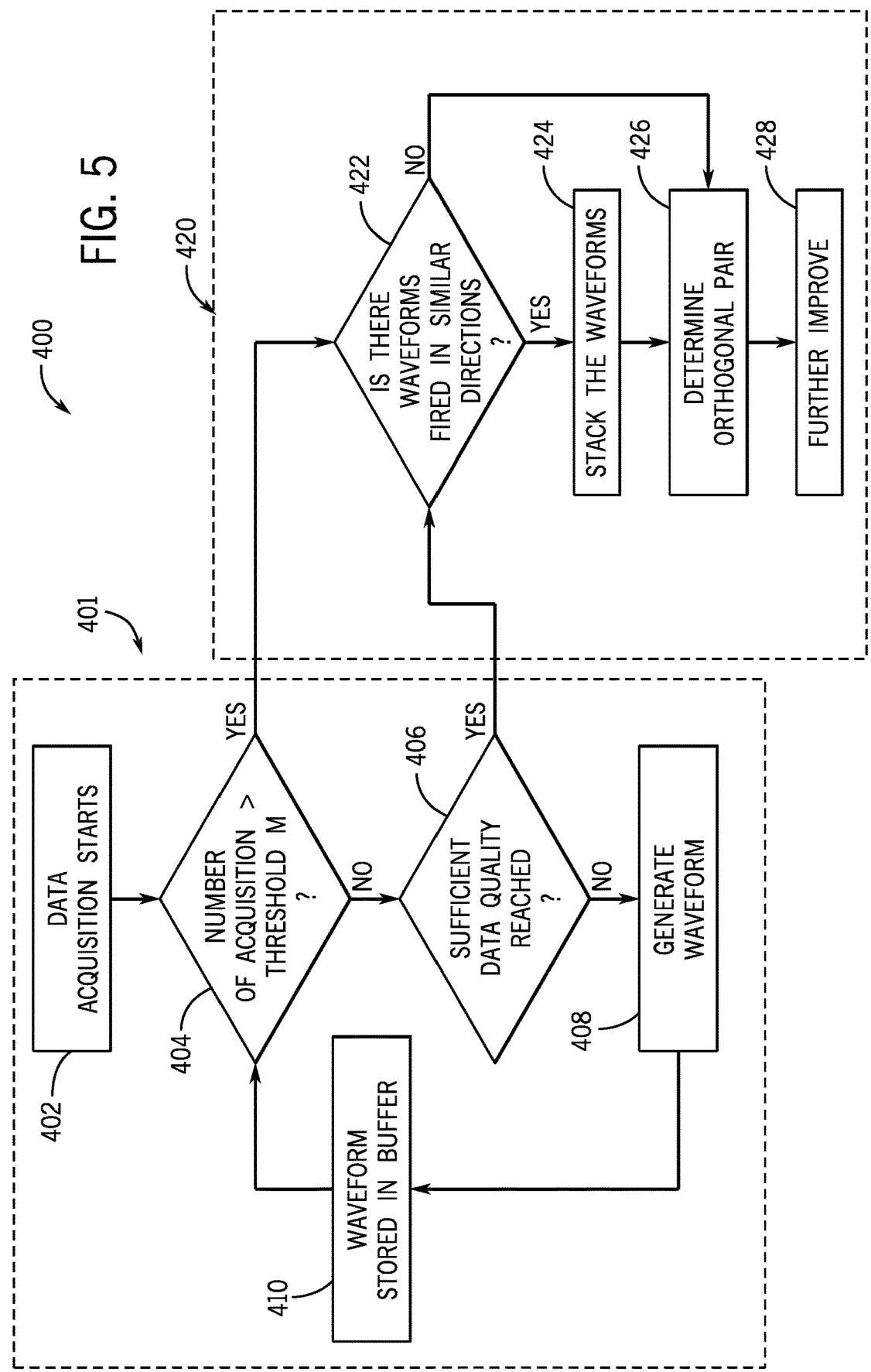

SYSTEMS AND METHODS FOR ACQUIRING ORTHOGONAL PAIRS OF WAVEFORMS FOR ACOUSTIC WELL LOGGING

BACKGROUND

This disclosure generally relates to downhole tools and, more particularly, to determining orthogonal pairs of directional acoustic waveforms by an acoustic downhole tool for generating accurate acoustic well logs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Various downhole devices are used to investigate properties and structures in an oil field. In some cases, a downhole tool string may include multiple non-destructive tools such as acoustic downhole tools used to image the area of a borehole drilled into a geological formation and the formation extending around the borehole. Oftentimes, the downhole tool string is conveyed along with a drill string in either Logging While Drilling (LWD) or Measuring While Drilling (MWD) modes. In other cases, the downhole tool string may be conveyed by a coil tubing or suspended from a wireline.

Downhole tools, such as acoustic downhole tools, may have different configurations based on frequency divisions. For sonic tools at the lower end of the acoustic frequency range, there may be a further division regarding the mode of excitation for the signals. For example, there may be monopole, unipole, dipole, quadrupole, and hexapole excitation modes, to name just a few.

An acoustic downhole tool may be used to measure one or more acoustic-wave properties to obtain data about the geological formation. The acoustic downhole tool may include transmitters, receiver arrays, and circuitry to facilitate the acquisition of this data indicative of properties of the geological formation. In some cases, cross-dipole measurements in boreholes may be acquired by the acoustic downhole tool. Generally, these dipole measurements provide the most accurate results when the two waveform firing directions (e.g., the directions at which acoustic signals are sent and measurement acquired) are orthogonal (e.g., perpendicular with respect to one another). The orthogonality of the two waveform firing directions (e.g., direction at which waveforms are generated by transmitters) may be achieved when the downhole tool is not rotating. However, when the downhole tool string is rotating (e.g., during drilling or pulling out the downhole tool) the orthogonality of the two sequent waveform firings generally may not be achieved, and analyzing non-orthogonal waveforms to generate a well log may be unfeasible, complicated, and/or undesirable. The difficulty in processing non-orthogonal waveforms may be exacerbated by a variety of factors, such as not knowing the rotational speed of the acoustic downhole tool, among other things.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

One embodiment of the present disclosure includes a system for improving certain quality between various waveforms in acoustic logging applications. The system includes a downhole tool that includes a transmitter and a receiver. Furthermore, the system includes a computing device communicatively coupled to the downhole tool. In particular, the computing device includes a processor and a memory device that stores instructions that cause the processor to perform at least part of the method of this disclosure. The instructions cause the processor to instruct the transmitter to generate the various waveforms detected by the receiver and store the various waveforms in a buffer. Furthermore, when each waveform of a subset of the various waveforms are each oriented in a similar direction, the instructions cause the processor to stack each waveform of the subset to generate one composite waveform. In addition, the instructions cause the processor to determine an orthogonal pair of waveforms based on the composite waveform and the various waveforms minus the subset of the various waveforms. The instructions also cause the processor to apply improved (e.g., or to update) operation parameters associated with the orthogonal pair of the acoustic waveforms to the downhole tool. As used herein, the term "improved operation parameters" refers to parameters that improve operation, as discussed in detail below. In some embodiments, the improved operation parameters may be initial operation parameters that are updated, using the techniques described herein.

Another embodiment of the present disclosure describes a method for determining orthogonal directional waveforms for an acoustic downhole tool. The method includes instructing, via a processor, a transmitter of the acoustic downhole tool to generate various waveforms. The method further includes receiving, via the processor, initial operation parameters indicative of each waveform of the various waveforms, storing, via the processor, data indicative of each waveform of various waveforms in a buffer until the various waveforms exceeds a minimum threshold value. Furthermore, when each waveform of a subset of the various waveforms each substantially share an orientation direction, the method includes stacking, via the processor, each waveform of the subset to generate one composite waveform. The method also includes determining, via the processor, an orthogonal pair of waveforms based on the composite waveform, the various waveforms minus the subset of the various waveforms, or any combination thereof and applying, via the processor, updated (e.g., improved) operation parameters associated with the orthogonal pair of the acoustic waveforms to the acoustic downhole tool.

Another embodiment of the present disclosure describes a tangible, non-transitory, computer-readable medium that stores instructions executable by one or more processors in a computing device of a downhole tool string. The instructions cause the one or more processors to instruct a transmitter of an acoustic downhole tool of the downhole tool string to generate various waveforms configured to be detected by a receiver of the acoustic downhole tool, store the various waveforms in a buffer of the computing device until the number of waveforms in the various waveforms exceeds a minimum threshold value, and when each waveform of a subset of the various of waveforms are each oriented in a similar direction, stack each waveform of the subset to generate one composite waveform. Furthermore, the instructions cause the one or more processors to determine an orthogonal pair of waveforms based on the composite waveform and the various waveforms minus the subset of the various waveforms. In addition, the instructions cause the one or more processors to apply improved (e.g., updated) operation parameters associated with the orthogonal pair of the acoustic waveforms to the acoustic downhole tool.

BRIEF DESCRIPTION OF THE DRAWINGS

Various aspects of this disclosure may be better understood upon reading the following detailed description and upon reference to the drawings, in which:

FIG. 5 is a flow diagram of a two-part process for determining orthogonal pairs of waveforms, according to an embodiment of the disclosure;

DETAILED DESCRIPTION

Figure 1:
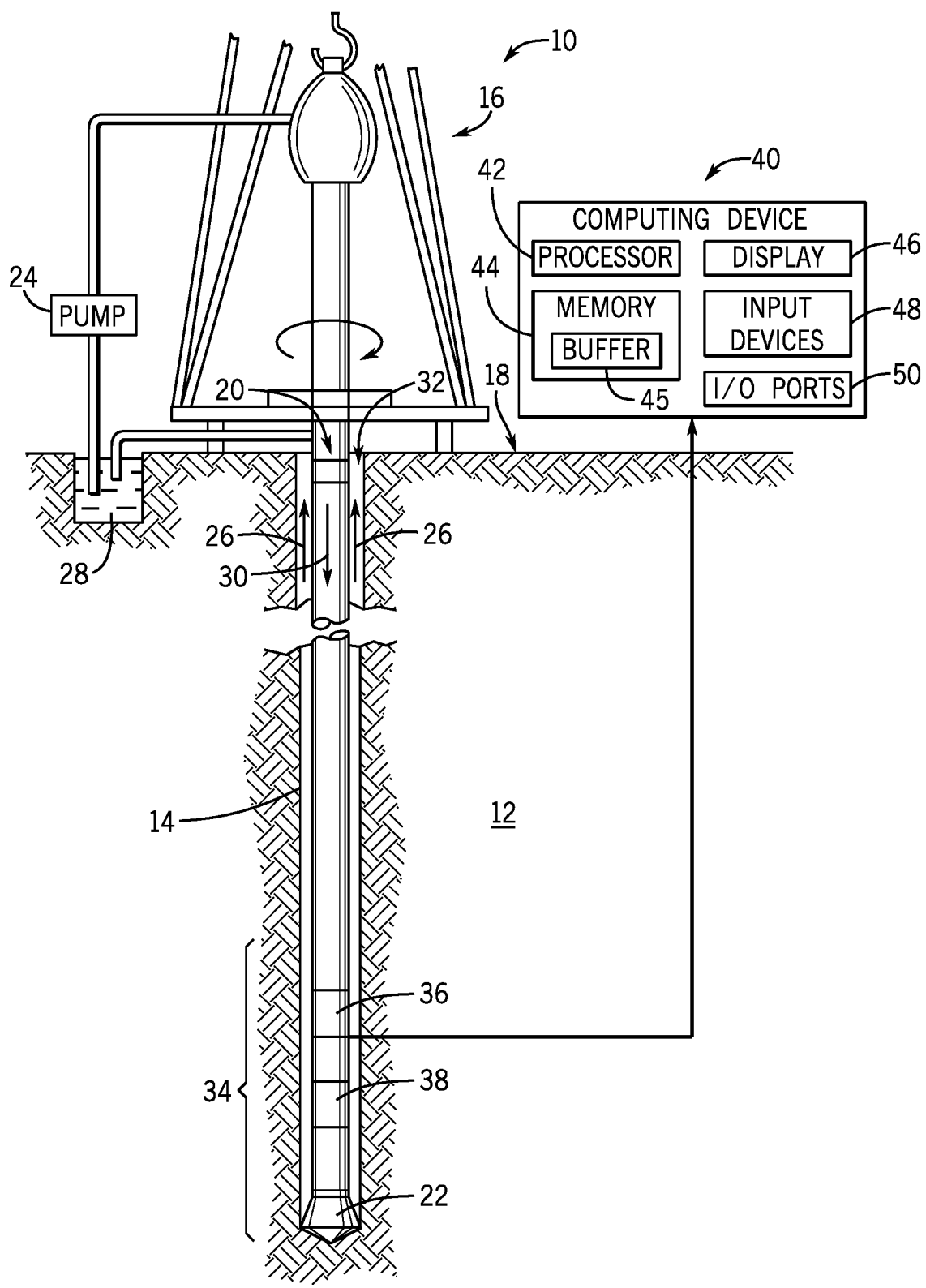
FIG. 1 is a schematic diagram of a drilling system including a downhole tool string, according to an embodiment of the disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a downhole tool string may be deployed in a borehole, also sometimes referred to as a wellbore, to facilitate determining characteristics of a geological formation. In some instances, multiple downhole tools may be connected together to form a downhole tool string. Moreover, it may be useful to retrieve measurements of certain logging conditions associated with the geological formation while drilling. Logging while drilling (LWD) refers to wireline-quality formation measurements made while drilling. These measurements may be sent to the surface, where an operator may use the measurements (e.g., by processing the measurements to obtain a well log) that may provide a greater understanding of the formation. The LWD tools may form a portion or the downhole tool string, and may take measurements of various formation properties, such as density, porosity, resistivity, caliper, inclination at the drill bit (NBI), magnetic resonance, formation pressure, and the like. These properties may be assembled into well logs. When the LWD tool includes an acoustic downhole tool, the acoustic measurements from that tool may be used to generate well logs that may be referred to as acoustic well logs.

An acoustic downhole tool may include transmitters, receiver arrays, and circuitry to facilitate the acquisition of measurements relating to properties of the geological formation. In some cases, cross-dipole measurements in a borehole may be acquired by an acoustic downhole tool employed on a downhole tool string. Generally, cross-dipole measurements provide more accurate results when the two firing directions (e.g., the directions at which acoustic signals are sent and measurement acquired) are orthogonal. The orthogonality of the two firing directions may be more easily achieved when the acoustic downhole tool is not rotating. However, when the acoustic downhole tool is rotating (e.g., during drilling or pulling out the downhole tool) the orthogonality of the two sequent firings occasionally may not be achieved. Since a variety of factors, such as not knowing the rotational speed of the acoustic downhole tool, limits in processing ability, and so forth, may impact the feasibility of processing cross-dipole measurements from a rotating acoustic downhole tool, this disclosure provides systems and methods for achieving orthogonal waveform firing directions, or substantially orthogonal waveform firing directions, even while the acoustic downhole tool is rotating.

In particular, the present disclosure includes systems and methods for determining and/or identifying an orthogonal pair of waveforms from an acoustic downhole tool, thereby enabling more accurate acoustic well logs. The proposed method includes repeatedly acquiring azimuthal data and data in the form of digital representations of the acoustic waveforms, and then storing the data in a buffer until a target number of digital representations of the acoustic waveforms are stored and/or until a suitable data quality is achieved, as discussed in detail below. Indeed, the suitable data quality may be achieved when a computing device determines that the orthogonality between any two subsequent waveform firings has been obtained, given the data stored in the buffer. Additionally or alternatively, the suitable data quality may be achieved when the data indications of the acoustic waveforms fired (e.g., number of digital representations of the acoustic waveforms) exceed a threshold value. After the acquisition of data is performed, the acoustic waveforms are stacked if the acoustic waveforms are fired to the same direction or substantially similar directions, thereby reducing or canceling out noise in the acoustic waveform. The improved orthogonal pair from waveforms are picked from the buffer using any suitable process, as discussed in detail below. In some embodiments, the timing and the type of excitation associated with each waveform of the improved orthogonal pair of waveforms may differ.

Moreover, in some embodiments, the process of acquiring the acoustic waveforms in the buffer may also include updating (e.g., improving) operation parameters (e.g., timing and type of excitation), hereinafter also called "improved operation parameters." For example, further improving (e.g., optimizing) these operation parameters may include finding the sets of time intervals between excitations that achieve, or are expected to have a sufficiently high probability of achieving, two sufficiently orthogonal waveforms for any tool rotation speed among the acquired waveforms. In some embodiments, the improved operation parameters may be applied prior to the firing of the acoustic waveforms and buffering the indications of the acoustic waveforms. Accordingly, improving (e.g., optimizing) the operation parameters may increase the reliability of cross-dipole measurements in boreholes by increasing a likelihood that two sufficiently orthogonal directional waveforms may be found, even regardless of the rotational velocity of the LWD tool of the downhole tool. Indeed, the reliability of acoustic downhole tools operating in LWD or MWD modes may be improved, which may enable well logs to be obtained by the acoustic downhole tools operating during those modes.

It should be understood that the disclosed subject matter is not limited to applications including dipole measurements. Indeed, the techniques described herein may be applied to other measurements, such as sonic, ultrasonic, and/or microseismic measurements carried out in boreholes, where improving certain quality between two or more waveform firing directions is useful.

To help illustrate the techniques described herein, one embodiment of a drilling system 10 that may be used to drill a well through geological formations 12, thereby forming a borehole 14 (e.g., wellbore), is shown in FIG. 1. In the depicted embodiment, a drilling rig 16 at the surface 18 may rotate a drill string 20, which includes a drill bit 22 at its lower end, to engage the geological formations 12. To cool and/or lubricate the drill bit 22, a drilling fluid pump 24 may pump drilling mud 26 from a mud pit 28, through the center 30 of the drill string 20 to the drill bit 22. At the drill bit 22, the drilling mud 26 may then exit the drill string 20 through ports (not shown) and flow into the borehole 14. While drilling, the drilling mud 26 may be pushed toward the surface 18 through an annulus 32 between the drill string 20 and the formation 12, thereby carrying drill cuttings away from the bottom of the borehole 14. Once at the surface 18, the returned drilling mud 26 may be filtered and conveyed back to the mud pit 28 for reuse. Additionally, the drilling mud 26 may exert a mud pressure on the formation 12 to reduce likelihood of fluid from the formation 12 flowing into the borehole 14 and/or out to the surface 18.

Furthermore, as depicted, the lower end of the drill string 20 includes a downhole tool string 34 that includes various downhole tools, such a measuring-while-drilling (MWD) tool 36 and a logging-while-drilling (LWD) tool 38. Generally, the downhole tools (e.g., MWD tool 36 and LWD tool 38) may facilitate determining characteristics of the surrounding formation 12. For example, the LWD tool 38 may retrieve measurements of geological characteristics, such as density, porosity, resistivity, acoustic-caliper, inclination at the drill bit (NBI), magnetic resonance, formation pressure, and the like. The LWD tool 38 may enable electromagnetic logging, logging while drilling induction tools, nuclear magnetic resonance (NMR) logging, nuclear logging, acoustic logging, and the like. For example, the LWD tool 38 may be an acoustic downhole tool that includes acoustic sources (e.g., transmitters), including transmitters (e.g., piezoelectric transmitters) that generate the acoustic waveforms (e.g., acoustic signals) by converting an electric signal into a sonic vibration that travels through the borehole 14 and formation 12. Generally, monopole (e.g., axisymmetric) transmitters generate omnidirectional waveforms around the circumference of the LWD tool 38, as described in detail below. In contrast, cross-dipole (nonaxisymmetric) transmitters generate azimuthally oriented waveforms. Accordingly, the cross-dipole measurements in the borehole 14 embedded into anisotropic or inhomogeneous formations allows one to define the azimuthal variation of the elastic properties of the formation 12.

The accuracy of these cross-dipole measurements is increased when the firing direction of the acoustic waveforms (e.g., acoustic signals) are orthogonal with respect to one another. In some embodiments, LWD tool 38 may include an acoustic tool such as the MP3 SonicScope, which rotates while drilling operations are being performed. Although the rotation of the LWD tool 38 could obstruct the orthogonality of the direction of the acoustic waveform firings, a computing system 40 may be used to determine orthogonal pairs of acoustic waveforms for analysis to generate accurate acoustic well logs using the orthogonal pairs even when the acoustic waveforms were obtained during rotation. For example, as discussed in detail below, improved operation parameters (e.g., firing modes, firing interval, and number of firings) may be implemented by the computing system 40 prior to generating the acoustic waveform to improve the quality (e.g., orthogonality) of the acoustic waveforms. In some embodiments, implementing the improved operation parameters includes updating the initial operation parameters using the techniques described herein.

In the depicted embodiment, the computing system 40 is used to perform the method disclosed herein. Moreover, the computing system 40 may be used to determine orthogonal pairs of waveforms in the drilling operations illustrated in the depicted embodiment. As depicted, the computing system 40 includes a processor 42, memory 44, a display 46, input device 48, and input/output (I/O) ports 50. The computing system 40 may be any suitable electronic device, such as a handheld computing device, a tablet computing device, a notebook computer, a desktop computer, a workstation computer, a cloud-based computing device, or any combination of such devices.

In the depicted embodiment, the processor 42 may execute instruction stored in memory 44 to perform operations, such as determining suitable orthogonal directions for the acoustic waveforms. As such, in some embodiments, the processor 42 may include one or more general purpose microprocessors, one or more application specific processors (ASICs), one or more field programmable logic arrays (FPGAs), or any combination thereof.

The memory 44 may be a tangible, non-transitory, computer-readable medium that stores instructions executable by and data to be processed by the processor 42. For example, in the depicted embodiment, the memory 44 may store instructions used to determine orthogonal waveforms, the direction of the acoustic waveforms, and forms describing the interaction between the LWD 38, the downhole tool string 34, the formation 12, the borehole 26, or any combination thereof. Thus, in some embodiments, the memory 44 may include random access memory (RAM), read only memory (ROM), rewritable non-volatile memory, flash memory, hard drives, optical discs, and the like.

Furthermore, the memory 44 may include one or more buffers 45, used to store the azimuthal data and the data indications of the acoustic waveform firings (e.g., the digital representation of acoustic waveforms generated when the acoustic waveforms are received by the transmitter(s)). Indeed, the buffers 45 may store the azimuthal data and the data indications of the acoustic waveform firings for at least part of the duration of the drilling operations. For example, new azimuthal data and new data indications of the acoustic waveform firings may replace previous azimuthal data and previous data indications of the acoustic waveform firings, respectively, on a periodic basis.

Furthermore, I/O ports 50 may enable the computing device 40 to interface with various other electronic devices. For example, the I/O ports 50 may enable the computing device to communicatively couple to a network, such as a personal area network (PAN), a local area network (LAN), and/or a wide area network (WAN). Accordingly, in some embodiments, the computing system 40 may receive data (e.g., as signals) from another electronic device (e.g., a base-station control system) and/or communicate the characteristics of the formation 12 retrieved by the LWD tool 38 (e.g., such as the orthogonal pairs of the acoustic waveforms determined by the technique described herein) to another electronic device (e.g., a base-station control system) via the I/O ports 50, for example, to enable another electronic device (e.g., a base-station control system) to retrieve the characteristics of the formation 12.

Additionally, the input device(s) 48 may enable a user to interact with the computing system 40, for example, to input properties and/or input instructions (e.g., control commands) to the computing device 40. Thus, in some embodiments, the input device 48 may include buttons, keyboards, mice, trackpads, and the like. Additionally or alternatively, the display 46 may include touch components that enable user inputs to the computing system 40 by detecting occurrence and/or position of an object touching its screen (e.g., surface of the display 46). In addition to enabling user inputs, the display 46 may present visual representations of information, such as the characteristics of the formation 12, the determined orthogonal pairs of waveforms, the log of data generated by the computing device 40, and the like.

Figure 2:
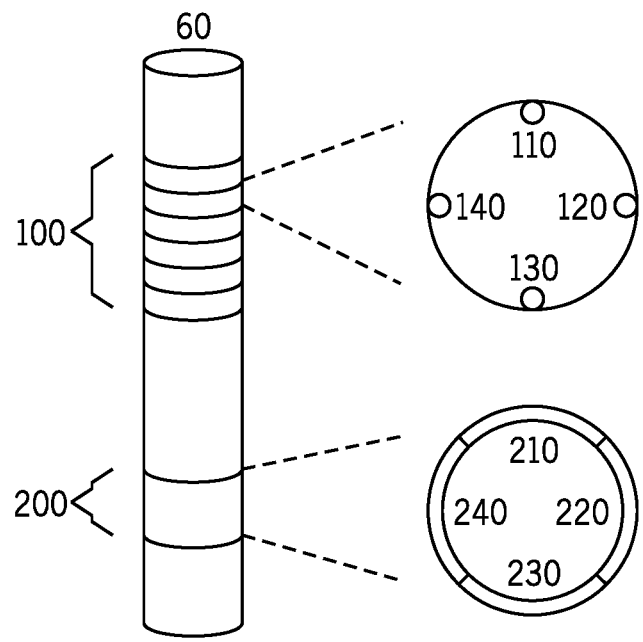
FIG. 2 is a schematic of a downhole multi-mode acoustic downhole tool that may be employed on the downhole tool string of FIG. 1, according to an embodiment of the disclosure.

Referring generally to FIG. 2, a downhole acoustic downhole tool 60 included in the downhole tool string 34 of FIG. 1 is shown having a receiver array section 100 and a transmitter section 200. Stated another way, FIG. 2 is an example of one system that may use the techniques described in the present disclosure, which include determining an orthogonal pair of waveforms. The depicted embodiment is intended to be an example and non-limiting, since the subject matter disclosed herein may be applied to any suitable acoustic tools that receive azimuthal measurements while drilling or being driven in rotation. For example, while the example of FIGS. 2-4b describe a system having certain specific numbers of receivers, the techniques described herein may be applied to acoustic tools that include more or fewer than those shown and may employ any suitable type of multipole transmitter.

In the depicted embodiment, in the receiver array section 100, there may be one or more sub-sections containing any number of receivers, such as four receivers, 110, 120, 130, 140, oriented orthogonally with respect to one another. As mentioned above, in some embodiments, the receiver array may include more than 4 receivers or, alternatively, less than 4 receivers and any suitable type of multipole transmitter. There may be a number of sub-sections of the, for example, four receivers 110-140, located along the length of the downhole acoustic downhole tool 60. The receivers 110-140 for each of the sub-sections may be aligned with one another along the length of the downhole acoustic downhole tool 60. As stated earlier, in some embodiments, the azimuth channels of the receiver array section 100 may be aligned with the quadrants of the transmitter 10 section 200.

Having the receivers 110-140 positioned orthogonally to one another may allow for the receipt of various modes of excitation by the individual receivers. The mode extraction after signal detection can be determined as follows. For monopole, the mode extraction is receiver 110+receiver 120+receiver 130+receiver 140. Accordingly, in some embodiments, there may be four separate dipole extraction modes. For the first dipole, the mode extraction is receiver 110+receiver 120−receiver 130−receiver 140. The second dipole has a mode extraction of receiver 110−receiver 120−receiver 130+receiver 140. The third dipole mode extraction is receiver 110−receiver 130. The fourth dipole mode extraction is receiver 120−receiver 140. In addition to monopole and dipole, the receiver array section 100 can function as a quadrupole receiver. The mode extraction for quadrupole receivers is receiver 110−receiver 120+receiver 130−receiver 140. Finally, the receiver array section 100 can operate in unipole mode. For unipole mode, the mode extraction is receiver 110, receiver 120, receiver 130, or receiver 140.

In the depicted embodiment, in the transmitter section 200 there are one or more sub-sections each containing four transmitters 210, 220, 230, 240, oriented orthogonal to one another. As mentioned above, in some embodiments, the receiver array may include more than 4 receivers or, alternatively, less than 4 receivers and any suitable type of multipole transmitter. All of the transmitters 210-240 for each of the sub-sections may be aligned with one another along the length of the downhole acoustic downhole tool 60. Transmitter 210 may be aligned with receiver 110, transmitter 220 is aligned with receiver 120, transmitter 230 is aligned with receiver 130, and transmitter 240 may be aligned with receiver 140.

Having four transmitters 210-240 positioned orthogonally to one another may allow for the modes. For the first dipole, the mode excitation is transmitter 210+transmitter 220−transmitter 230−transmitter 240. The second dipole has a mode excitation of transmitter 210−transmitter 220−transmitter 230+transmitter 240. The third dipole mode excitation is transmitter 210−transmitter 230. The fourth dipole mode excitation is transmitter 220−transmitter 240. In addition to monopole and dipole, the transmitter section 200 can function as a quadrupole transmitter. The mode excitation for quadrupole transmitters is transmitter 210−transmitter 220+transmitter 230−transmitter 240. Finally, the transmitter section 200 can operate in unipole mode. For unipole mode, the mode excitation is transmitter 210, transmitter 220, transmitter 230, or transmitter 240.

Each quadrant transmitter 210-240 can be excited by either positive or negative power (or polarity) to generate waveforms (e.g., acoustic signals) in desired modes such as monopole, dipole, quadrupole, and other higher order modes such as hexapole. Unipole waveform firing may also be performed using one of the transmitters.

Each azimuth receiver 110-140 detects signals and digitized waveform data (e.g., data indications of the acoustic waveform firing) decomposed into multiple modes for interpretation of formation acoustic characteristics. In some embodiments, a magnetometer and/or an accelerometer sensor can correlate such waveform data with the tool orientation and position. Alternatively, the magnetometer and/or the accelerometer sensor can be used so that the timing of the acoustic waveform firing (e.g., downhole acoustic transmitter firing) can be controlled to occur at a desired orientation in the borehole 14 or during a desired timing during drilling operations, particularly while the Logging While Drilling (LWD) tool 38 is rotating.

For instance, the transmitter can be made to fire at a desired azimuthal orientation in order to obtain multiple waveforms at the same depth or to control the azimuthal resolution sampling expected. In some embodiments, combining these waveforms together improves robustness to downhole drilling noise while obtaining an acoustic slowness measurement that is azimuthally oriented and azimuthally sampled as per user request. Thus, a single sub-set of the transmitter section 200 can excite multiple modes and the receiver arrays 110-140 of receiver array section 100 extracts multiple modes. This method has many applications for oilfield acoustic logging tools such as extracting formation dipole mode data to measure shear slowness, anisotropy, etc. However, when the LWD tool 38 is rotating (e.g., during drilling or pulling out the downhole tool) the orthogonality of the two sequent waveform firings is generally not achieved. Since the analysis of non-orthogonal waveforms may be unfeasible, complicated, and/or undesirable, using the techniques described herein, the computing device 40 may determine orthogonal waveform firing directions, or substantially orthogonal waveform firing directions, for a rotating LWD tool 38. In many cases, this may be regardless of the rotation speed of the LWD tool 38.

Figures 3A, 3B:
FIG. 3A is a cross-sectional schematic of a transmitter section showing monopole mode excitation, according to an embodiment of the disclosure.
FIG. 3B is a cross-sectional schematic of a transmitter section showing unipole mode excitation, according to an embodiment of the disclosure.

Turning now to FIG. 3, FIGS. 3A-3G reflect some of the different configurations and the different excitation modes available with embodiments of this disclosure. The depicted embodiments of the different configurations and the different excitation modes are intended to be exemplary to facilitate discussion and are in no way limiting, since the subject matter disclosed herein may be applied to a variety of acoustic tools. For example, as mentioned above, the techniques described herein may be applied to acoustic tools that include more than 4 receivers (e.g., or less than four receivers) and any suitable type of multipole transmitter. In some embodiments, the transmitter sections 200 may include four transmitters 210-240 that may be fired using either positive or negative polarity. This accounts for the positive and negative labeling to the outside of the cross-section of the transmitter section 200 shown. FIG. 3A represents a monopole mode excitation. In the depicted embodiment, the four transmitters 210-240 may be positively powered together to produce a monopole mode excitation. Alternatively or additionally, in some embodiments, the four transmitters 210-240 may be negatively powered.

Unipole mode excitation is shown in example FIG. 3B. In unipole mode excitation, only one transmitter is fired, in this illustrative example, transmitter 210 is shown as the firing transmitter while the other transmitters 220-240 are shown as not firing. The unipole mode excitation is produced in the +90 orientation as shown by the arrow in the figure. Of course, any suitable type of multipole transmitter (e.g., the four transmitters 210-240) may be used to produce a unipole mode in the corresponding direction of the firing transmitter.

Figure 3C:
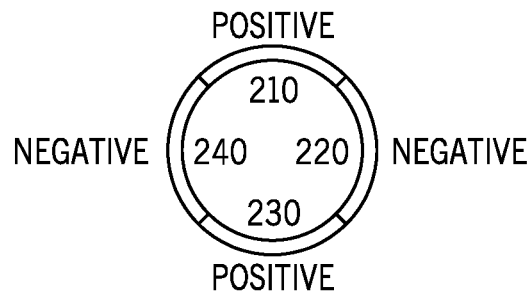
FIG. 3C is a cross-sectional schematic of a transmitter section showing quadrupole mode excitation, according to an embodiment of the disclosure.

Referring generally to FIG. 3C, this configuration shows a quadrupole mode excitation. In quadrupole mode excitation, transmitters 210 and 230 may be positively powered while orthogonal transmitters 220 and 240 are negatively powered. As with the previous example, other configurations in which one set of transmitters is positive and an orthogonal set of transmitters is negative can also be used to produce a quadrupole mode excitation. Absent the techniques described in detail below, incorporating this configuration into rotating downhole tool strings 34 may result in non-orthogonal waveforms.

Figure 3D:
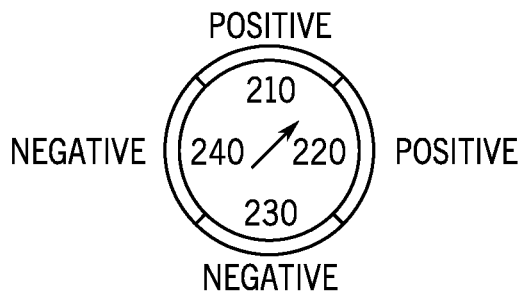
FIG. 3D is a cross-sectional schematic of a transmitter section showing a first dipole mode excitation at a +45 degree angle, according to an embodiment of the disclosure.
Figure 3E:
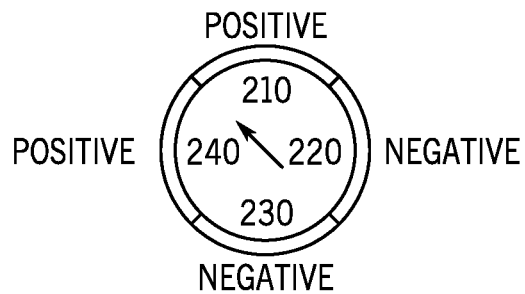
FIG. 3E is a cross-sectional schematic of a transmitter section showing a second dipole mode excitation at a −45 degree angle, according to an embodiment of the disclosure.
Figure 3F:
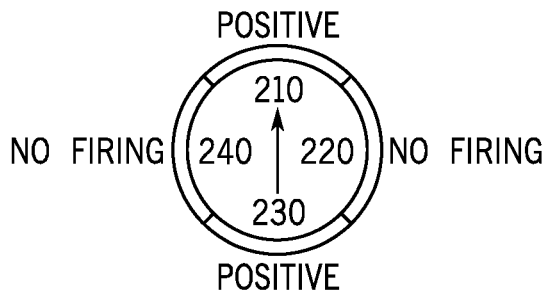
FIG. 3F is a cross-sectional schematic of a transmitter section showing a third dipole mode excitation at a 0 degree angle, according to an embodiment of the disclosure.
Figure 3G:
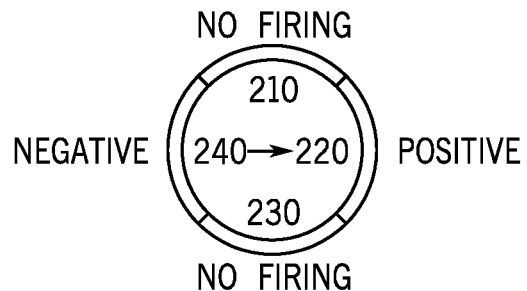
FIG. 3G is a cross-sectional schematic of a transmitter section showing a fourth dipole mode excitation at a +90 degree angle, according to an embodiment of the disclosure.

The remaining illustrative figures FIG. 3D-3G all feature dipole mode excitation configurations. These figures show general configurations for dipole mode excitation and other embodiments are not limited to only these specific transmitters. In FIG. 3D, transmitters 210 and 220 are positively powered while transmitters 230 and 240 are negatively powered. In this specific case, the dipole mode excitation will be in the +45 degree orientation. For FIG. 3E, transmitters 210 and 240 are positively powered while transmitters 220 and 230 are negatively powered. This results in a dipole mode excitation in the −45 orientation. FIG. 3F has transmitter 210 positively powered and opposite transmitter 230 negatively powered. Transmitters 220 and 240 do not fire. The resulting dipole mode excitation is in the +90 orientation as shown by the arrow. Finally, FIG. 3G has transmitter 220 positively charged and opposite transmitter 240 negatively charged. Transmitters 210 and 230 are not firing. The resulting dipole mode excitation is produced at 0 degrees and is shown by the arrow.

FIGS. 3A-3G illustrate some examples of transmitter excitation modes according to embodiments of the present disclosure. The receivers 110-140 aligned with each quadrant transmitter 210-240, can detect waveform firings (e.g., acoustic signals), and by decomposing the acoustic waveform a particular waveform mode can be extracted to process and interpret the formation acoustic properties.

In some embodiments of the downhole acoustic downhole tool 60 disclosed herein, a hardware platform, such as the computing device 40, is provided on which control and processing software is operated. The downhole acoustic downhole tool 60 may be housed in a metal drill collar allowing it to be placed in drilling assemblies suitable for use in the oil and gas industry. Depending upon application specifications, a dual axis magnetometer system may be used to measure the orientation of the downhole acoustic downhole tool relative to the earth's magnetic field. Using the data output from those magnetometers, the downhole acoustic downhole tool 60 may be able to identify and/or record the position of a reference point on the collar relative either to true north, when borehole deviation is near vertical, or top of the hole in the case of a deviated borehole.

Orientation is described in other references, such as co-owned US Patent Application Publication no.: US 2014/0241111A1, "Acoustic Borehole Imaging Tool," the contents of which are incorporated herein in their entirety for all purposes. In the application, the application of azimuthal angle information is provided for a LWD sonic tool. Similar aspects of the azimuthal angle information and system may be used in embodiments of the current disclosure.

Figure 4A:
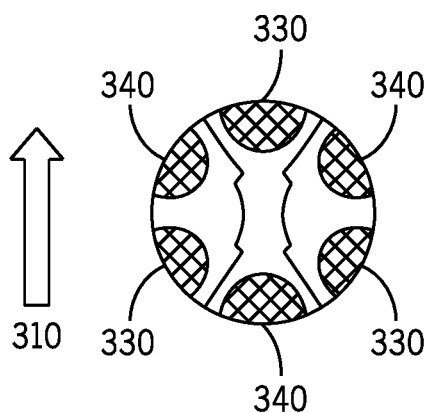
FIGS. 4A and 4B show two hexapole mode firings, 3A is Y-Hexapole and 3B is X Hexapole, according to an embodiment of the disclosure.
Figure 4B:
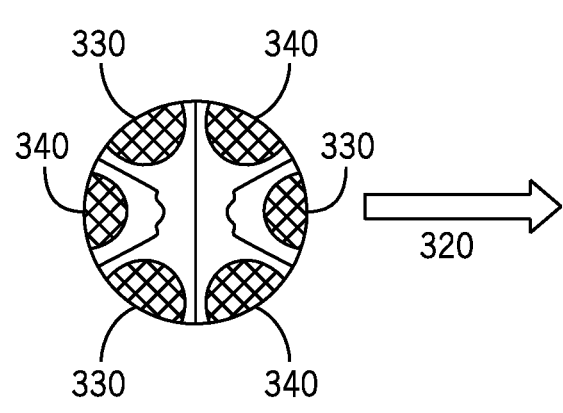

Higher order azimuthal modes measured with an LWD dipole sonic acoustic downhole tool may be used for deriving elastic properties of a formation and for quality control of the dipole measurements. In addition to other uses of dipole modes for measuring formation anisotropy, hexapole mode is one of examples for such higher order azimuthal modes. Hexapole mode shares the same antisymmetric plane as dipole mode. As shown in FIGS. 4A and 4B, two orthogonal hexapole modes may be measured with two orthogonal dipole mode firings. For hexapole firing, the transmitters are placed in groups of three. Two groups, hexapole group 330 and hexapole group 340 are shown. One of the groups is positively powered while the other group is negatively powered.

In FIG. 4A, six transmitters are shown. The top transmitter 330 and the two transmitters 330 immediately below the horizontal line may be positively powered, and the transmitter 340 opposite to the top and the two transmitters 340 immediately above the horizontal line may be negatively powered. The resulting hexapole mode excitement is in the Y-direction to the top of the figure as shown by the left most arrow 310. The resulting dipole firing direction is a y-dipole mode excitation at +90 degrees.

FIG. 4B has the transmitter 330 on the right positively powered and the two transmitters 330 to the left of the vertical line also positively powered. The transmitter 340 on the left and the two transmitters 340 immediately to the right of the vertical line may be negatively powered. The resulting hexapole mode excitation is to the right of the figure as shown by the right most arrow 320. The resulting dipole firing direction is an x-dipole mode excitation at 0 degrees.

Turning to FIG. 5, depicted is an embodiment of a flow diagram 400 for a two-part process used in determining orthogonal pairs of the acoustic waveforms. In some embodiments, the computing device 40 may perform at least part of the two-part process. Furthermore, the two-part process may be useful in determining orthogonal pairs of waveforms in rotating downhole tool strings 34 operating in LWD or MWD modes. A first part 401 of the two-part process includes storing a suitable number data indications of the acoustic waveforms in a buffer 45 (e.g., in the memory device 44), as described below with regard to FIG. 6. The second part 420 of the two-part process includes determining the orthogonal pair of waveforms (e.g., via the processor 42 of the computing device 40), based at least on the data indications of the acoustic waveforms stored in the buffer 45, as discussed below with regard to FIG. 7. In particular, the flow diagram 400 includes acquiring azimuthal data (process block 402). In some embodiments, the azimuthal data includes data indicative of the directivity of the acoustic waveform excitation (e.g., dipole, quadrupole, unipole, etc.) caused by the transmitter firing, data indicative of the distance between receiver(s) and the transmitter(s), data indicative of the orientation of the downhole tool string 34, data indicative of the position (e.g., x, y, z coordinates) of the downhole tool string 34 during the transmitter firing (e.g., generation of the acoustic waveforms), data indicative of the number of waveforms acquired, data indicative of the time associated with the acoustic waveform firings (e.g., caused by the transmitter firing), or the like.

With regard to determining the suitable number of data indications of the acoustic waveforms to store in the buffer 45, the computing device 40 determines if the number of acquisitions of data indications of the number of waveforms exceeds a threshold value (decision block 404), hereinafter called "threshold value, M." Alternatively or in addition, the computing device 40 may determine if sufficient data quality (e.g., orthogonality) has been acquired (decision block 404). Moreover, the computing device 40 or the downhole acoustic tool 12 may repeatedly acquire data indications of the waveforms, until the number of indications of the acoustic waveforms stored in the buffer 45 exceed a threshold value M and/or until the sufficient data quality (e.g., indicative of potential orthogonality) has been acquired. The threshold value M may represent any suitable number of acoustic waveforms that, when acquired, may enable the computing device 40 to determine orthogonal pairs of waveforms, as will be discussed further below.

When the computing device 40 determines that the number of acquisitions of data indicative of the waveforms stored in the buffer 45 does not exceed the threshold value M (decision block 404), the computing device 40 determines if sufficient data quality is reached (decision block 406). When sufficient data quality has not been reached, the computing device 40 causes the transmitter to fire a waveform (process block 408). In some embodiments, the data indications of the acoustic waveforms are captured (e.g., stored) in the buffer 45 (process block 410). After the data indicative of the directional waveform are stored in the buffer 45 (process block 410), the computing device 40 determines again if the number of indications of the acoustic waveforms exceeds the threshold value, M, (decision block 404) and/or determines if sufficient data quality has been reached (decision block 406). After determining that the number of directional waveforms exceeds the threshold value M (decision block 404) and/or determining that sufficient data quality (e.g., orthogonality) has been reached, the computing device 40 concludes the first part of process of flow diagram 400 and proceeds to the second part of the flow diagram 400.

In some embodiments, the second part 420 of the process of flow diagram 400 includes performing the techniques described herein to determine an orthogonal pair of directional waveforms without knowledge of the rotation speed (e.g., angular velocity) of the acoustic downhole tool 60 of the downhole tool string 34. The second part 420 may include determining the direction of the acoustic waveforms stored in the buffer 45, and determining whether any waveforms were fired in a similar direction (e.g., have a similar direction) (decision block 422). If the computing device 40 identifies that one or more waveforms were each fired in a similar direction as any other waveforms fired by the transmitter, the computing device 40 may stack the acoustic waveforms (process block 424). In some embodiments, stacking the acoustic waveforms may reduce signal noise by averaging or canceling out the noise. After at least a portion of the acoustic waveforms having similar firing directions to other waveforms are stacked, in some embodiments, the computing device 40 determines a suitable orthogonal pair (process block 426). As discussed in detail below, the computing device 40 may determine the suitable orthogonal pair of directional waveforms via any suitable process (process block 426), such as convex optimization, eigenvalue decomposition, asymptotic analysis, sequential approximation, and the like. For example, the improved quality of the orthogonal pairs may results from application of the improved operation parameters, such as the timing of each waveform fired (e.g., generated) by the transmitter, the type of excitation (e.g., dipole, quadruple, unipole, etc.) produced by the transmitter, the number of waveform acquisitions recorder in one buffer 45, the number of buffers 45 used, etc. Indeed, the improved operating parameters may be applied as system constraints or inputs to the process discussed herein. The orthogonal pair of waveforms determined by the computing device 40 may be updated at any suitable time interval.

Figure 6:
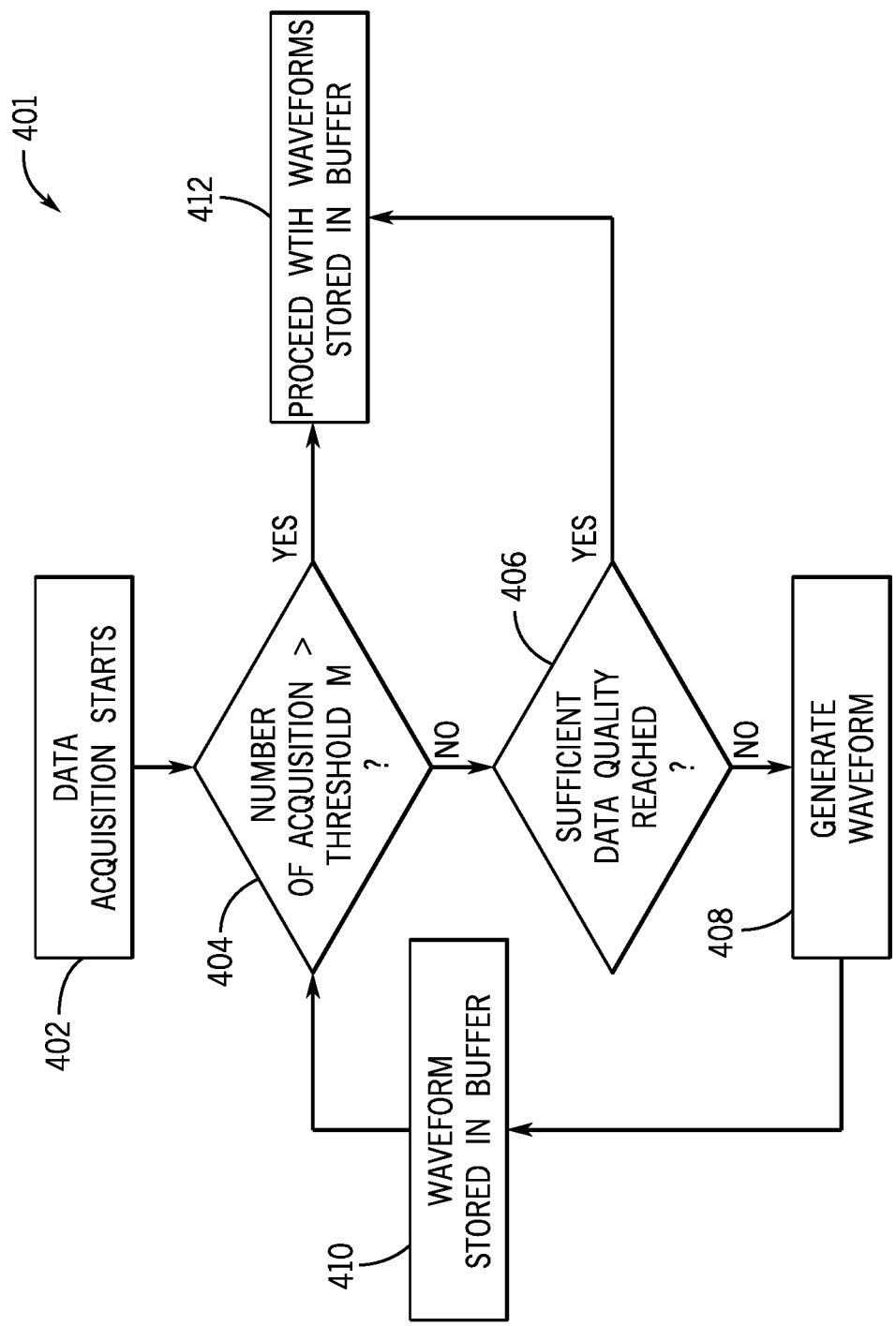
FIG. 6 is a flow diagram of the first part of the process of the flow diagram of FIG. 5, whereby a suitable number of waveforms are stored in a buffer, according to an embodiment of the disclosure.

FIG. 6 is a flow diagram of the process of the first part 401 of the flow diagram 400 of FIG. 5, whereby a suitable number of waveforms are stored in a buffer 45, according to an embodiment of the disclosure. To facilitate discussion, the subject matter disclosed herein includes a discussion of a computing device 40 configured to perform the first part 401, such that the computing devices 40 stores data in one buffer 45, but it should be understood that in some embodiments, any suitable number of buffers 45 may store any suitable number of indications of the acoustic waveforms. Indeed, the number of indications of the acoustic waveforms may be stored in the buffer 45 they exceed threshold value M and/or satisfy sufficient data quality specifications.

Furthermore, the first part 401 includes the computing device 40 that acquires and stores azimuthal data (process block 402). As described above, the transmitter of the tool may include one or more multipole transmitters with any azimuthal symmetry and directivity of excitation (e.g. dipole, quadrupole, unipole, etc.) and one or more receivers located at some respective distance from the one or more multipole transmitters. Furthermore, the azimuthal data may include data indicative of the directivity of the acoustic waveform excitation (e.g., dipole, quadrupole, unipole, etc.) caused by the firing of the transmitter(s), data indicative of the distance between receivers and the transmitter(s), data indicative of the orientation of the downhole tool string 34, data indicative of the position (e.g., x, y, z coordinates) of the downhole tool string 34 during the transmitter firing (e.g., generation of the acoustic waveforms), data indicative of the number of waveforms acquired, data indicative of the time associated with the acoustic waveforms (e.g., the time at which the firing of the transmitter occurs), and the like. The acquisition of the azimuthal data by the computing device 40 may be facilitated by any suitable device. For example, data indicative of the orientation position of the downhole tool strong 34 within the borehole may be measured by one or more magnetometers and/or one or more accelerometers embedded to the downhole tool string (e.g., embedded to the sonic tools or from other adjusted tools).

In some embodiments, the azimuthal data is stored in the memory device 44. For example, after measurements of the orientation of the downhole tool string 34 are received (e.g., by the magnetometer), the measurements may be stored in the memory device 44. In addition or alternatively, the azimuthal data may be stored in the buffer 45. For example, the data indicative of the directional waveform may be stored in the buffer 45 and used to determine the orthogonal pair of directional waveforms. As described in detail below, any of the azimuthal data may be used to determine the suitable orthogonal pair of directional waveforms.

While the azimuthal data is being acquired (process block 402), the computing device 40 may determine if the number of indications of the acoustic waveforms acquired by the computing device 40 and stored in the buffer 45 is greater than the threshold value, M (decision block 404). In some embodiments, when the computing device 40 acquires and stores data indicative of the acoustic waveforms, the computing device 40 maintains a log of the data. Indeed, the computing device 40 may associate a number for each directional waveform. For example, the first data indication of the directional waveform may be associated with the number one, the second data indication of another directional waveform may be associated with the number two, the third data indication of yet another directional waveform may be associated with the number three, etc. Furthermore, after every data indication of the directional waveform, the computing device 40 may determine if the number of data indications (e.g., one, two, three, etc.) of the directional waveforms stored in the buffer 45 exceed the threshold value, M (decision block 404).

In some embodiments, when the computing device 40 determines that the number of indications of the directional waveforms acquired by the computing device 40 is less than (i.e., not greater than, or not greater than or equal to) the threshold value M, the computing device 40 determines if sufficient data quality has been reached (decision block 406). The computing device 40 may assess the entirety of the azimuthal data acquired and determine if sufficient azimuthal data has been acquired (and/or stored in the memory device 44). Sufficient azimuthal data quality has been reached when the computing device 40 has enough azimuthal data to determine suitable orthogonal pairs of directional waveforms. For example, to determine the suitable orthogonal pair of directional waveforms, the computing device 40 may involve various coordinate measurements (e.g., a measurement of the position of the acoustic downhole tool 60 every 100 ms between 1 and 7 seconds) associated with the position of the acoustic downhole tool 60 over the time that the data indication of the acoustic waveforms have been acquired.

Thus, in some embodiments, the computing device 40 may proceed (process block 412) toward the second part 420, when the computing device determines that sufficient azimuthal data quality has been stored in the buffer 45. In some embodiments, the computing device 40 may proceed (process block 412) toward the second part 420, when the computing device determines that sufficient azimuthal data quality, although the number of data indications of the directional waveforms does not exceed the threshold value, M.

However, when the number of data indications of the directional waveforms does not exceed the threshold value, M, nor has sufficient azimuthal data quality been acquired, as determined by the computing device 40, the computing device 40 may instruct the transmitter to fire an additional waveform (process block 408). Indeed, the computing device 40 instructs the transmitter to generate (e.g., fire off) another waveform, such that the receiver receives the directional waveform used to determine characteristics of the formation 12 and the borehole 14. In some embodiments, the receiver may detect the directional waveform generated by the transmitter and send a signal indicative of the generated waveform to the computing device 40, wherein the computing device 40 may process the signal to determine characteristics of the formation 12 and the borehole 14. Furthermore, in some embodiments, the computing device 40 may determine various acoustic characteristics of the acoustic waveform based on the signal received from the receiver. In particular, the computing device 40 may determine the directivity (e.g., dipole, monopole, quadrupole, etc.) of the acoustic waveform, the time the acoustic waveform was generated (e.g., fired off), and/or any other suitable acoustic characteristics (e.g., the sound pressure, the particle velocity, the particle displacement, the sound intensity, wave shape, etc.). However, it should be understood that, in some embodiments, the acoustic characteristics of the acoustic waveform may be determined by a base-station controller, the receiver, or any other suitable technique.

After the directional waveform is generated (e.g., by the transmitter), the acoustic characteristics of the acoustic waveform are stored (e.g., captured) in the buffer 45 (process block 410). In some embodiments, the azimuthal data associated with the generated waveform is also stored in the buffer 45. After the acoustic characteristics of the acoustic waveform and the azimuthal data is stored in the buffer 45, the computing device 40 again determines if the number of data indications of the directional waveforms exceed the threshold value, M. In some embodiments, the computing device 40 may determine if the number associated with data indication of the most recent directional waveform is greater than the threshold value, M. For example, the tenth data indication of the directional waveform may be associated with the number ten, such that the number ten is compared against the threshold value, M. When the number ten is greater than the threshold value, M, the computing device 40 proceeds to the second part 420 of the process of determining the orthogonal directional waveforms. Accordingly, the first part 401 may be iteratively performed until either the number of data indications of the acoustic waveforms exceeds the threshold value, M, or sufficient data quality has been reached. However, it should be understood that in some embodiments, the first part 401 may be iteratively performed until both the number of data indications of the directional waveforms exceeds the threshold value, M, and sufficient data quality has been reached. After the computing device 40 determines that the number of data indications of the directional waveforms exceeds the threshold value, M, the computing device proceeds with the data indications of the acoustic waveforms stored in the buffer 45 and their respective acoustic characteristics (process block 412).

Figure 7:
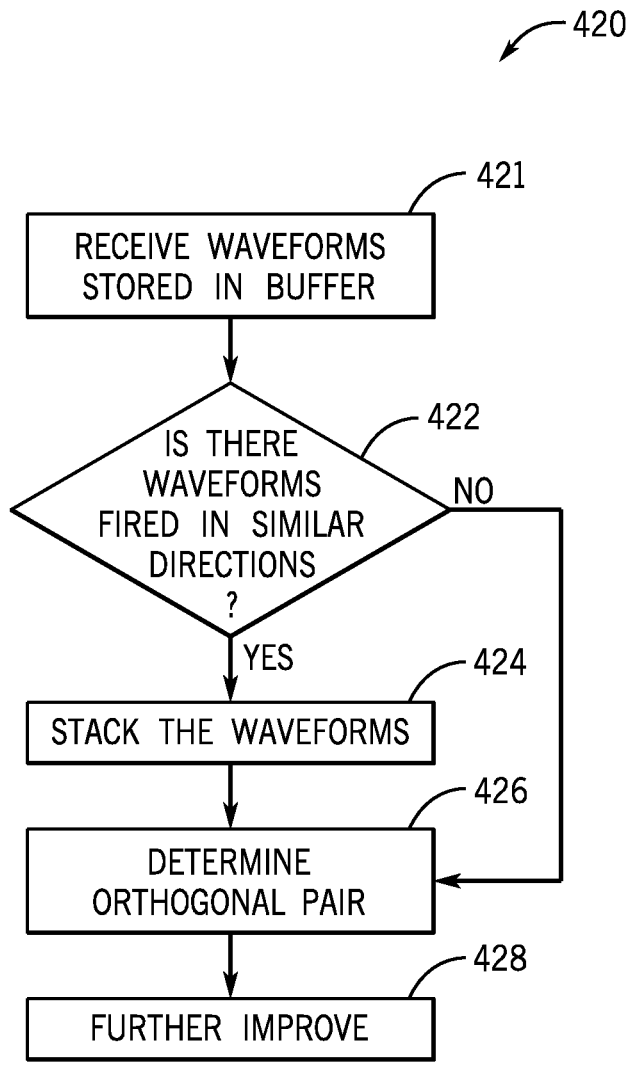
FIG. 7 is a flow diagram of the second part of the process of the flow diagram of FIG. 5, whereby a suitable orthogonal pair of waveforms is determined, according to an embodiment of the disclosure.

Turning to FIG. 7, depicted is a flow diagram of the second part 420 of the process of the flow diagram 400 of FIG. 5, where a suitable orthogonal pair of waveforms is determined, based at least on the data indications of the acoustic waveforms stored in the buffer 45, according to an embodiment of the disclosure. It should be understood that the computing device 40 may execute the second part 420. Indeed, in an embodiment, the computing device receives the data indications of the acoustic waveforms stored in the buffer 45 and their respective acoustic characteristics (process block 421).

After receiving the data indications of the acoustic waveforms, the computing device 40 identifies the direction of each waveform stored in the buffer 45 and determines whether any of the acoustic waveforms were fired in a similar direction with respect to one another (decision block 422). In particular, the computing device 40 may identify two or more waveforms as being generated (e.g., fired) in a similar direction if the difference between the directions (e.g., orientation in units of degrees) of the two waveforms is below an orientation threshold value, X. For example, the computing device 40 may be modified to include an orientation threshold value, X, equal to 5°, such that the computing device 40 may determine that a first waveform having a direction of 45°, a second waveform having a direction of 47.5°, and a third waveform having a direction of 48°, all have a similar direction because the difference between the three directions is less than the orientation threshold value, X, of 5°. It should be understood that in other exemplary embodiments, the orientation threshold value, X, may be any other suitable value, such that the computing device 40 may identify waveforms as having a similar direction in response to identifying that the differences between the directions (e.g., orientation in units of degrees) of the acoustic waveforms is below an orientation threshold value X (e.g., 5°).

After the computing device 40 identifies the acoustic waveforms that are oriented in similar directions, the computing device 40 stacks the acoustic waveforms having similar directions (process block 424) with respect to one another. For example, a first set of waveform may include a first waveform having a direction of 45°, a second waveform having a direction of 47.5°, and a third waveform having a direction of 48°, all have a similar direction because the difference between the three directions is less than the orientation threshold value, X, of 5°, such that these three waveforms are stacked to produce one composite waveform. In another example, a second first set of waveform may include a first waveform having a direction of 4° and a second waveform having a direction of 0°, both having a similar direction because the difference between the two directions is less than the orientation threshold value, X, of 5°. As such, in the exemplary embodiment, the acoustic waveforms of the second set are stacked to produce another composite waveform.

In some embodiments, stacking the acoustic waveforms includes determining a mean (e.g., average) of the acoustic waveforms that each have a similar direction. In some embodiments, stacking the acoustic waveforms may eliminate and/or reduce the amount of noise associated with waveforms. Furthermore, as mentioned above, after waveforms have been stacked together, one composite waveform may result. For example, when three waveforms are determined to have similar firing directions, the three waveforms with the similar firing direction are stacked together (process block 422), such that one composite waveform with reduced signal noise is generated by the computing device 40.

In some embodiments, when there are no waveforms with similar firing directions, the computing device 40 may pick an orthogonal pair of waveforms (process block 426). That is, when the computing device 40 does not identify two or more waveforms having a difference in firing direction below an orientation threshold value X, the computing device 40 determines an orthogonal pair of waveforms (process block 426).

In some embodiments, determining the orthogonal pair (e.g., for rotating acoustic downhole tools 60) from buffer 45 may be enhanced when the improved (e.g., updated) operation parameters are accounted for (process block 428). The operation parameters may include the timing of each waveform generated by the transmitter, the type of waveform (e.g., dipole, quadruple, unipole, etc.), the firing direction, the number of indications of the acoustic waveforms stored in one buffer 45, and/or the number of buffers 45. In some embodiments, the improved operation parameters (process block 428) may be applied prior to generating the acoustic waveform (process block 408) and/or prior to acquiring azimuthal data (process block 402). More specifically, the orthogonality between two waveforms in the buffer 45 may be examined using the error angle, γ, such that the orthogonality between two waveforms in the buffer 45 may be entirely orthogonal for γ=0° or collinear (i.e., entirely non-orthogonal) for γ=90°.

In accordance with an aspect of the disclosed subject matter, the computing device 40 may determine, using the process for determining the improved operation parameters (process block 428), an improved timing for the generation of the acoustic waveforms (e.g., determine the timing for the signal firings), such that the improved timing for the generation of the acoustic waveforms reduces the γ value observed for the acoustic downhole tool 60 operating at various rotation speeds. For example, the computing device 40 may determine that the γ value decreases for a certain rotation speed of the downhole tool 34 when the generation of the acoustic waveforms occurs at times t=1.5, 1.76, and 2.87 seconds, thereby improving the quality of azimuthal data for the downhole tool rotating at a certain speed. Accordingly, in some embodiments, the computing device 40 may use the improved timing for the firing of the acoustic waveforms to decrease the γ value. Therefore, the process of determining the improved operation parameters by reducing the γ value may be performed prior to the start of the first part 401, such that it is performed prior to acquiring azimuthal data (process block 402).

In some embodiments, the process of determining the improved operation parameters (process block 428) may be independent of the logging conditions (e.g., downhole temperature, downhole pressure, angular speed of the rotating downhole tool, available memory size, etc.). Accordingly, the acquisition and storage of azimuthal data and the execution of the process of determining the improved operation parameters (process block 428) may or may not rely on the logging conditions received, for example, from magnetic sensors or accelerometers. The logging conditions may be (or may not be) used to control or correct the operation parameters which were defined after determining initial operation parameters. It should be understood that, alternatively, the process of determining the improved operation parameters (process block 428) may depend on the logging conditions, such that the process of determining the improved operation parameters (process block 428) may be controlled, updated, or substituted depending on the response of the downhole tool 34 to the logging conditions.

Figure 8:
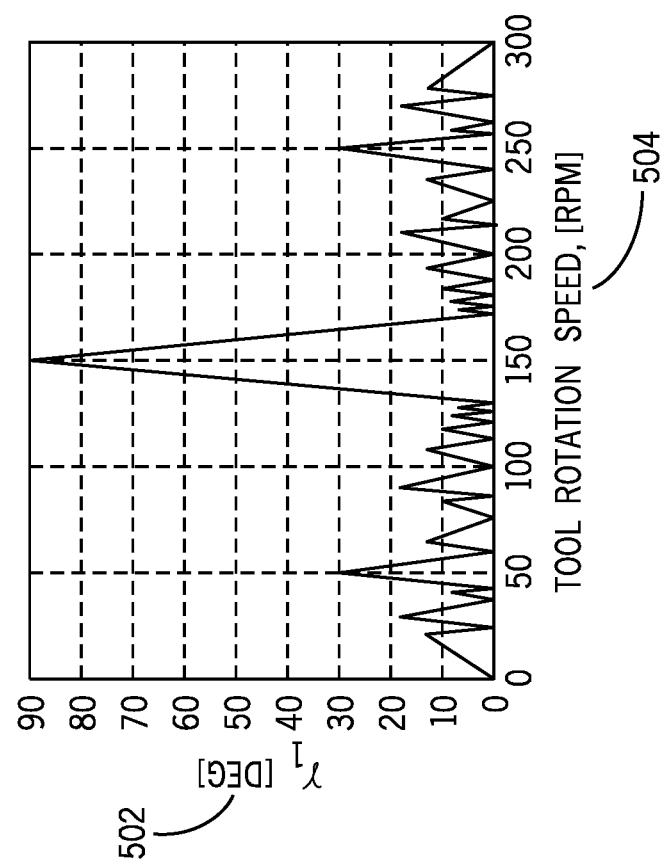
FIG. 8 is a plot of error angle, γ, at various rotation speeds corresponding to a system that has not been improved using the techniques disclosed herein, according to an embodiment of the disclosure.

FIG. 8 is a plot 500 of error angle 502, γ, at various rotation speeds 504 corresponding to a system that has not been improved using the techniques disclosed herein, according to an embodiment of the disclosure. As depicted in the plot, the error angle 502, γ, in units of degrees) (°) plotted against the rotation speed (e.g., angular speed) 504 in units of revolutions per minute (RPM). Furthermore, in the exemplary depicted embodiment, eight dipole measurements are recorded into the buffer 45. The 1st, 3rd, 5th and 7th waveform firings (i.e., waveform generations) were performed along zero (0°) azimuth of the downhole tool 34, and the 2nd, 4th, 6th and 8th waveform firings were performed along 90° azimuth. The time interval between each waveform firing $\Delta t_i$ (i=1 . . . 7) is uniform, occurring at intervals of about 100 ms. In the depicted embodiment, for a rotation speed 504 of 0 RPMs, an orthogonal pair is present in the buffer 45 since the error angle 502, γ=0°, while for a rotation speed 504 of 150 RPMs, the acoustic waveforms are entirely non-orthogonal (e.g., collinear) since the error angle 502, γ=90°. For this particular example, it is possible to further improve the orthogonality in the buffer 45 by applying the process of determining the improved operation parameters (process block 428), whereby irregular time delays $\Delta t_i$ between waveform firings are applied.

Figure 9:
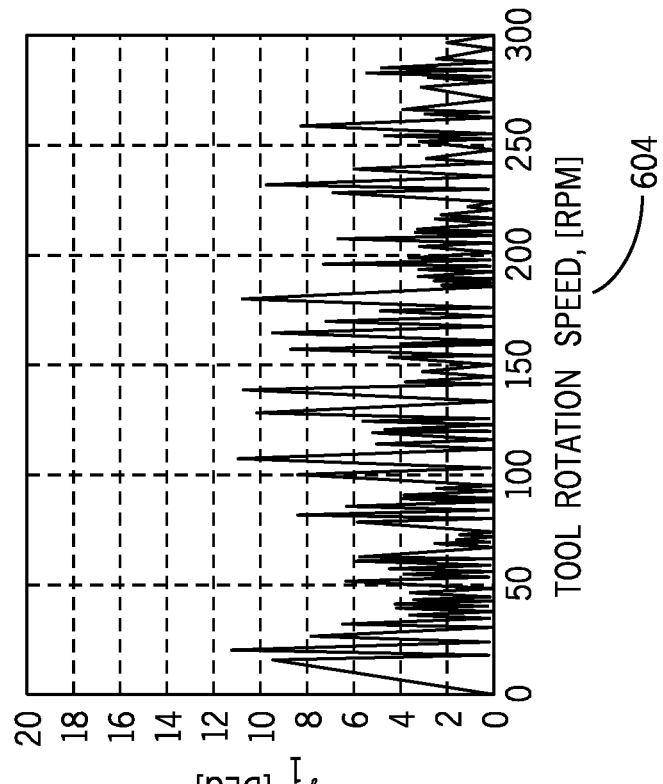
FIG. 9 is a plot of error angle, γ, at various rotation speeds corresponding to a system that has been improved using the techniques disclosed herein, according to an embodiment of the disclosure.

Turning to FIG. 9, depicted is a plot 600 of error angles 602, γ, at various rotation speeds 604 corresponding to a system that has been improved using the techniques disclosed herein, according to an embodiment of the disclosure. As depicted in the plot, the error angle 602, γ, in units of degrees (°) is plotted against the rotation speed (e.g., angular speed) 604 in units of revolutions per minute (RPM). Compared to the plot 500 of FIG. 8, where the time interval between each waveform firing $\Delta t_i$ (i=1 . . . 7) is uniform (e.g., occurring at intervals of about 100 ms, in the plot 600 of FIG. 9, the time intervals between each waveform firings are further improved (e.g., further optimized) to provide the minimal γ value for any downhole tool 34 having a rotation speed 604 between 0 RPMs to 300 RPMs. Indeed, FIG. 9 depicts the plot of the error angle 602, γ, vs. the rotation speed for an improved set of time intervals, $\Delta t_i$=[121, 102, 100, 110, 400, 400, 137] ms. In particular, the maximum value of the error angle 602, γ, decreased from 90° (in FIG. 8) to 11° (in FIG. 9). Accordingly, using the techniques described herein, the error angle 502, 602, γ, may be reduced to generate an improved orthogonal pair of waveforms.

In particular, applying the process of determining the improved operation parameters (process block 428) to the acquisition of the azimuthal data and the storing of data indications associated with the acoustic waveform firings in buffers 45, the selection of orthogonal pair of waveforms may be improved to increase the reliability of the downhole tools 34. Furthermore, while in FIGS. 8 and 9, the process of determining the improved operation parameters is used to further improve the time interval between waveform firings (e.g., by the transmitter), it should be understood that the process of determining the improved operation parameters may be used to further improve (e.g., further optimize) the type of waveform firing (e.g., dipole, quadruple, unipole, etc.), the direction of waveform firing, the number of indications of waveforms stored in the buffer 45, the number of buffers 45 used, and the like.

Accordingly, technical effects of the present disclosure include improving determining an orthogonal pair of waveforms. In some embodiments, the present disclosure provides techniques for selecting the improved orthogonal pair of waveforms is based at least in part on acoustic characteristics of the acoustic waveforms, indications of the acoustic waveforms, and/or azimuthal data. The proposed method includes repeatedly acquiring azimuthal data and data indications of the acoustic waveforms, and then storing the data in a buffer 45 until a target number of indications of the acoustic waveforms are stored or until a suitable data quality is achieved, as discussed in detail below. After the acquisition of data is performed, the acoustic waveforms are stacked if the acoustic waveforms are fired to the same direction or substantially similar directions, thereby eliminating noise in the acoustic waveform. Finally, the improved orthogonal pair from waveforms are picked from the buffer 45 using any suitable process of determining the improved operation parameters. In this manner, the techniques of the present disclosure enable determining a suitable orthogonal pair of waveforms, thereby improving the reliability of formation and borehole characteristics using an acoustic downhole tool.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system used for acoustic logging operations in a subterranean wellbore, the system comprising:
a downhole logging tool comprising an acoustic transmitter and an acoustic receiver, the tool configured to make downhole acoustic logging measurements while deployed and rotating in a subterranean wellbore;
and a computing device deployed in the downhole logging tool and communicatively coupled to the acoustic transmitter and the acoustic receiver, wherein the computing device comprises:
a processor;
and a memory device configured to store instructions, the instructions configured to cause the processor to:
instruct the acoustic transmitter to sequentially fire a plurality of times while the logging tool is rotating in the subterranean wellbore;
instruct the acoustic receiver to receive an acoustic waveform corresponding to each of said transmitter firings;
instruct a magnetometer or an accelerometer to measure a rotational orientation of the logging tool in the wellbore corresponding to each of said transmitter firings;
store in a buffer said received waveforms and the measured rotational orientation of the logging tool corresponding to each waveform;
select at least one pair of said stored waveforms, the pair including first and second of said stored waveforms wherein the measured rotational orientation of the first waveform is substantially orthogonal to the measured rotational orientation of the second waveform;
and process said selected pair to generate an acoustic well log, said log being indicative of characteristics of the subterranean wellbore and a formation through which the wellbore penetrates.

2. The system of claim 1, wherein the instructions are configured to cause the processor to instruct the acoustic transmitter to sequentially fire until a number of waveforms received by the receiver exceeds a threshold value.

3. The system of claim 1, wherein the instructions are configured to cause the processor to instruct the acoustic transmitter to fire after initial operation parameters have been determined.

4. The system of claim 3, wherein the initial operation parameters comprise:
data indicative of a directivity of each waveform of the plurality of waveforms;
data indicative of a distance between the acoustic receiver and the acoustic transmitter;
data indicative of a time when each waveform of the plurality of waveforms is generated;
data indicative of an excitation type for each waveform of the plurality of waveforms generated;
data indicative of an orientation of the downhole tool;
data indicative of a position of the downhole tool at a time when each waveform of the plurality of waveforms is generated;
data indicative of a total number of waveforms of the plurality of waveforms acquired; or
any combination thereof.

5. The system of claim 1, comprising instructions configured to apply updated operation parameters to adjust an operation of the downhole tool.

6. The system of claim 5, wherein the instructions configured to apply the updated operation parameters comprise updating initial operation parameters associated with each waveform of the plurality of waveforms.

7. The system of claim 1, wherein the instructions configured to select the at least one pair of waveforms comprises choosing a pair of waveforms from the plurality of waveforms with an error angle, $\gamma$, closest to zero.

8. The system of claim 1, wherein the instructions are configured to cause the processor to store the plurality of waveforms in the buffer after determining that a number of waveforms of the plurality of waveforms exceeds a threshold value.

9. The system of claim 1, wherein the downhole logging tool comprises a logging while drilling (LWD) tool.

10. The system of claim 1, wherein the instructions are further configured to cause the processor to:
identify a subset of said received waveforms sharing a common rotational orientation;
stack said subset of waveforms to generate a composite waveform; and
storing the composite waveform and the common rotational orientation in the buffer.

11. The system of claim 1, wherein the instructions are further configured to cause the processor to instruct the acoustic transmitter to fire with an irregular time delay between adjacent ones of said plurality of firings.

12. A method for acoustic logging a subterranean wellbore, the method comprising:
(a) rotating a downhole acoustic logging tool in a subterranean wellbore, the downhole acoustic logging tool including an acoustic transmitter and an acoustic receiver;
(b) instructing, via a processor, the transmitter to fire a plurality of times while rotating in (a);
(c) receiving, via the processor, an acoustic waveform corresponding to each of said transmitter firings in (b);
(d) measuring a rotational orientation of the logging tool in the wellbore corresponding to each of said transmitter firings in (b);
(e) storing, via the processor, each of the waveforms received in (c) and the corresponding rotational orientation measured in (d) in a buffer;
(f) selecting, via the processor, at least one pair of said stored waveforms, the pair including first and second of said stored waveforms wherein the measured rotational orientation of the first waveform is substantially orthogonal to the measured rotational orientation of the second waveform;
and (g) processing the at least one pair to generate an acoustic log of the subterranean wellbore.

13. The method of claim 12, wherein first and second of said received waveforms share a common rotational orientation when a difference between the rotational orientations measured in (d) is less than an orientation threshold.

14. The method of claim 12, further comprising applying updated operation parameters that update initial operation parameters.

15. The method of claim 12, wherein the initial operation parameters comprise:

data indicative of a directivity of each waveform of the plurality of waveforms;

data indicative of a distance between the receiver and the transmitter;

data indicative of a time when each waveform of the plurality of waveforms is generated;

data indicative of an excitation type for each waveform of the plurality of waveforms;

data indicative of an orientation of the acoustic downhole tool;

data indicative of a position of the acoustic downhole tool at a time when each waveform of the plurality of waveforms is generated;

data indicative of a total number of waveforms of the plurality of waveforms generated; or any combination thereof.

16. The method of claim 12, further comprising:
(h) processing the at least one pair selected in (f) to determine characteristics of the subterranean wellbore and a formation through which the wellbore penetrates.

17. The method of claim 12, wherein (e) further comprises:
identifying a subset of said received waveforms sharing a common rotational orientation;
stacking said subset of waveforms to generate a composite waveform; and
storing the composite waveform and the common rotational orientation in the buffer.

18. The method of claim 12, wherein (b) further comprises instructing, via the processor, the transmitter to fire with an irregular time delay between adjacent ones of said plurality of firings.

* * * * *